(12) United States Patent
Tsirkin et al.

(10) Patent No.: US 10,089,024 B2
(45) Date of Patent: Oct. 2, 2018

(54) MEMORY DEDUPLICATION PROTECTION FOR MEMORY PAGES

(71) Applicant: Red Hat Israel, Ltd., Ra'anana (IL)

(72) Inventors: Michael Tsirkin, Ra'anana (IL); Petr Matousek, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 262 days.

(21) Appl. No.: 14/946,523

(22) Filed: Nov. 19, 2015

(65) Prior Publication Data
US 2017/0147240 A1    May 25, 2017

(51) Int. Cl.
| | |
|---|---|
| *G06F 9/455* | (2018.01) |
| *G06F 3/06* | (2006.01) |
| *G06F 12/1009* | (2016.01) |
| *G06F 12/14* | (2006.01) |

(52) U.S. Cl.
CPC .......... *G06F 3/0619* (2013.01); *G06F 3/0644* (2013.01); *G06F 3/0652* (2013.01); *G06F 3/0673* (2013.01); *G06F 9/45558* (2013.01); *G06F 12/1009* (2013.01); *G06F 12/1475* (2013.01); *G06F 2009/45583* (2013.01)

(58) Field of Classification Search
None
See application file for complete search history.

(56) References Cited

U.S. PATENT DOCUMENTS

| | | |
|---|---|---|
| 6,789,156 B1 | 9/2004 | Waldspurger |
| 6,886,085 B1 | 4/2005 | Shuf et al. |
| 8,484,162 B2 | 7/2013 | Prahlad et al. |
| 8,849,898 B2 | 9/2014 | Tofano |
| 8,909,845 B1 * | 12/2014 | Sobel .................. G06F 9/45558 711/154 |
| 2013/0097380 A1 * | 4/2013 | Colgrove .......... G06F 17/30159 711/118 |

(Continued)

OTHER PUBLICATIONS

Miller, Konrad, et al.; "KSM++: Using I/O-Based Hints to Make Memory-Deduplication Scanners More Efficient," retrieved from http://os.itec.kit.edu/downloads/publ_2012_miller-ua_ksm.pdf on Nov. 19, 2015, Karlsruhe Institute of Technology (KIT). Mar. 3, 2012, 8 pages.

(Continued)

*Primary Examiner* — Emerson Puente
*Assistant Examiner* — Steven Do
(74) *Attorney, Agent, or Firm* — Haynes and Boone, LLP

(57) ABSTRACT

An example method of providing memory deduplication protection for one or more memory pages includes inserting an identifier of a first memory page into a list of memory pages for which memory deduplication is avoided. The first memory page is located in a virtual address space allocated to a memory consumer. The method also includes determining whether to deduplicate a second memory page. The method further includes determining whether an identifier of the second memory page is included in the list of memory pages. The method also includes in response to determining that the identifier of the second memory page is included in the list of memory pages, determining that the second memory page should not be deduplicated to provide memory deduplication protection for the second memory page.

19 Claims, 6 Drawing Sheets

(56) References Cited

U.S. PATENT DOCUMENTS

2013/0283062 A1* 10/2013 Fiske ............... G06F 21/602
  713/189
2014/0331017 A1 11/2014 Dawson et al.

OTHER PUBLICATIONS

Simha, Dilip; "RPE: The Art of Data Deduplication," retrieved from http://www.ecsl.cs.sunysb.edu/tr/rpe21.pdf on Nov. 19, 2015, Department of Computer Science, StonyBrook University, Sep. 9, 2011, 52 pp.

Groninger, Thorsten; "Analyzing Shared Memory Opportunities in Different Workloads," retrieved from http://os.itec.kit.edu/downloads/sa_2011_groeninger-thorsten_shared-memory-opportunities.pdf on Nov. 19, 2015, Karlsruher Institut for Technologie, Aug. 8, 2011, 56 pp.

Eidus, Izik, et al.; "How to Use the Kernel Samepage Merging Feature", retrieved from https://www.kernel.org/doc/Documentation/vm/ksm.txt on Nov. 19, 2015; Nov. 17, 2009. 2 pp.

Van Riel, Rik; "KVM Performance Optimizations Internals", retrieved from http://www.redhat.com/summit/2011/presentations/summit/in_the_weeds/thursday/riel_t_420_kvm_performance.pdf on Nov. 19, 2015, Red Hat Inc., May 5, 2011. 25 pp.

IP.com Disclosure No. IPCOM000230922D "Active Memory Deduplication—Aware of Trusted Execution Policies of LPAR," retrieved from http://priorart.ip.com/IPCOM/000230922 on Nov. 19, 2015, The IP.com Prior Art Database, Sep. 18, 2013, 1 pg, Abstract only.

* cited by examiner

MEMORY DEDUPLICATION PROTECTION FOR MEMORY PAGES

FIELD OF DISCLOSURE

The present disclosure generally relates to memory management, and more particularly to providing memory deduplication protection for memory pages.

BACKGROUND

Memory deduplication improves memory utilization by detecting that two (or more) pages in memory are identical and merging the duplicate pair of pages into a single page. In an example, a first memory page may reside in a first application's memory space, and a second memory page may reside in a second application's memory space. If the first and second memory pages have the same content, the first memory page may be considered a duplicate of the second memory page and removed. In such an example, the page table of the first application may be modified to point to the second memory page, and the first application may use the second memory page rather than the first memory page, thus improving the utilization of memory.

BRIEF SUMMARY

Methods, systems, and techniques are provided for providing memory deduplication protection for one or more memory pages. It may be desirable to provide memory deduplication protection for a memory page if, for example, the memory page stores security-sensitive data to prevent leakage of the security-sensitive data.

According to an embodiment, a method of providing memory deduplication protection for one or more memory pages includes inserting, by a memory manager, an identifier of a first memory page into a list of memory pages for which memory deduplication is avoided. The first memory page is located in a virtual address space allocated to a memory consumer. The method also includes determining, by the memory manager, whether to deduplicate a second memory page. The method further includes determining, by the memory manager, whether an identifier of the second memory page is included in the list of memory pages. The method also includes in response to determining that the identifier of the second memory page is included in the list of memory pages, determining that the second memory page should not be deduplicated to provide memory deduplication protection for the second memory page.

According to another embodiment, a system for providing memory deduplication protection for one or more memory pages includes a memory that stores a plurality of memory pages. A first one of the plurality of memory pages is located in an address space allocated to a memory consumer. The system also includes a deduplication protection indicator associated with a first one of the plurality of memory pages. The system further includes a protection module that sets the deduplication protection indicator to a protected mode that provides memory deduplication protection for the memory page. The system also includes a memory deduplication module that scans memory pages in user memory and determines whether a deduplication protection indicator associated with a scanned memory page is in the protected mode. In response to a determination that the scanned memory page is in the protected mode, the memory deduplication module determines that the scanned memory page should not be deduplicated.

According to another embodiment, a machine-readable medium includes a plurality of machine-readable instructions that when executed by one or more processors are adapted to cause the one or more processors to perform a method including: receiving, by a memory manager, an indication to set a first memory page to a protection mode that provides memory deduplication protection for the first memory page, where the first memory page is located in a virtual address space allocated to a memory consumer; setting, by the memory manager, the first memory page to the protection mode in response to receiving the indication; determining, by the memory manager, whether to deduplicate a second memory page; determining, by the memory manager, whether the second memory page is set to the protection mode; and in response to determining that the second memory page is set to the protection mode, determining that the second memory page should not be deduplicated.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
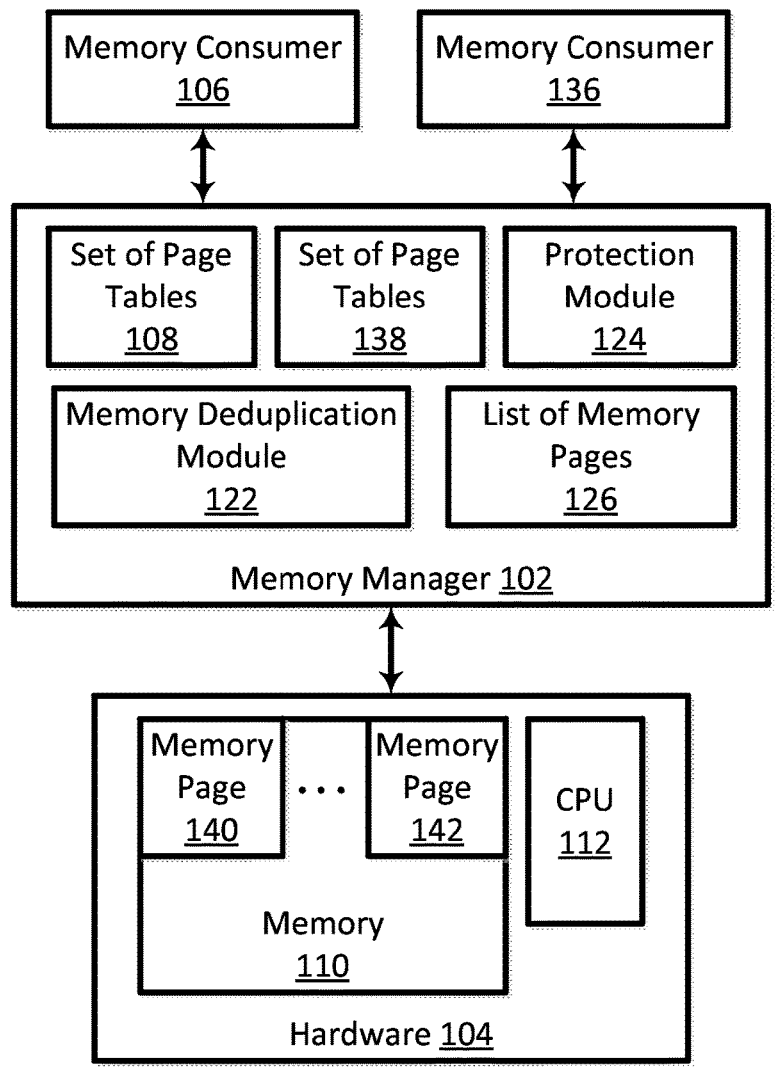
FIG. 1 depicts a computing device for providing memory deduplication protection for one or more memory pages in accordance with one or more aspects of the present disclosure.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architecture
  A. Application as Memory Consumer
  B. Virtual Machine as Memory Consumer
III. Example Process Flow
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A memory manager executing on a machine may process memory pages, insert them into a data structure, and identify memory pages in the data structure that are identical. Two memory pages are identical if the content stored at those pages is the same. If two memory pages are identified as being identical, the memory manager may identify the memory consumers that use those particular memory pages and map the two memory consumers to reference one of those identical memory pages and discard the other memory page. A memory consumer may be, for example, an application nor a virtual machine. Both the first memory consumer's page table and the second memory consumer's page table may store a mapping to the same memory page, which may be referred to as a deduplicated memory page. If the first memory consumer attempts to modify the deduplicated memory page, the memory manager provides the first memory consumer with a copy of the deduplicated memory page and updates the mapping in the first memory consumer's page table to reference the copy of the deduplicated memory page (rather than to the original deduplicated memory page). The first memory consumer may then be allowed to write to the copy of the deduplicated memory page.

Memory deduplication improves memory utilization by detecting that two (or more) pages in memory have identical content. Memory deduplication analyzes patterns of information by segmenting a dataset into, for example, variable length blocks and searching for recurring blocks. All identical successive blocks are replaced with a pointer to the respective initial detected block instead of storing the block again. When reading the file, the pointer series ensures that all the blocks are accessed in the exact order.

Memory deduplication may also have some disadvantages. A first memory consumer may attempt to access a memory page that is referenced by both the first memory consumer and a second memory consumer running on the same machine. If the first memory consumer attempts to write to the deduplicated memory page and it takes a while for the write to complete, the first memory consumer or user of the first memory consumer may speculate that another memory consumer points to the same memory page, and the memory page was deduplicated and copied on the write. Based on the difference in timing for performance of the write to the memory page, the first memory consumer or user of the first memory consumer may determine that another memory consumer was using the same memory page and it was deduplicated. This is problematic because it causes information to leak from one application to another application.

In an example, the memory manager is a hypervisor, and the memory consumers are virtual machines that run on the same host machine. A user of the first virtual machine may point a browser to a particular webpage, and due to the time it takes to perform an action on the webpage, the user may guess that a second virtual machine running on the same machine has visited that particular page because the code of the webpage was referenced by the first virtual machine. If the first virtual machine detects that the access to the webpage took a longer time than a typical write, the user may guess that another virtual machine has a page in its memory that the first virtual machine has visited.

It may be desirable to provide memory deduplication protection for one or more memory pages to prevent information from being leaked. This may be especially desirable for memory pages that store security-sensitive data. For example, the memory consumer may notify the memory manager about important memory pages that should not be deduplicated. Described herein are methods and systems for providing memory deduplication protection for one or more memory pages. In some embodiments, a method of providing memory deduplication protection for one or more memory pages includes inserting, by a memory manager, an identifier of a first memory page into a list of memory pages for which memory deduplication is avoided. The first memory page is located in a virtual address space allocated to a memory consumer. The method also includes determining, by the memory manager, whether to deduplicate a second memory page. The method further includes determining, by the memory manager, whether an identifier of the second memory page is included in the list of memory pages. The method also includes in response to determining that the identifier of the second memory page is included in the list of memory pages, determining that the second memory page should not be deduplicated to provide memory deduplication protection for the second memory page.

Unless specifically stated otherwise, as apparent from the following discussion, it is appreciated that throughout the description, discussions utilizing terms such as "determining," "inserting," "sending," "receiving," "detecting," "reading," "setting," "creating," "scanning," "deduplicating," "storing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 depicts a computing device 100 for providing memory deduplication protection for one or more memory pages in accordance with one or more aspects of the present disclosure. Computing device 100 includes a memory manager 102 coupled to hardware 104. Hardware 104 includes memory 110 and a CPU 112, and may include other input/output (I/O) devices. A memory consumer 106 and a memory consumer 136 may run in computing device 100. Each of the memory consumers may be allocated an address space corresponding to memory 110.

"Memory" herein shall refer to volatile or non-volatile memory, such as random access memory (RAM), read-only memory (ROM), electrically erasable ROM (EEPROM), or any other memory capable of storing data. A "CPU" may also be referred to as a "physical processor" or "processor" herein. A CPU shall refer to a device capable of executing instructions encoding arithmetic, logical, or I/O operations. In one illustrative example, a CPU may follow the Von Neumann architectural model and may include an arithmetic logic unit (ALU), a control unit, and a plurality of registers. In a further aspect, a CPU may be a single core CPU that is typically capable of executing one instruction at a time (or process a single pipeline of instructions), or a multi-core CPU that may simultaneously execute multiple instructions. In another aspect, a CPU may be implemented as a single integrated circuit, two or more integrated circuits, or may be a component of a multi-chip module (e.g., in which individual microprocessor dies are included in a single integrated circuit package and hence share a single socket).

Computing device 100 may be coupled over a network (not shown). The network may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and HTTP, and various combinations of the foregoing.

Memory manager 102 may allocate memory to a memory consumer running on computing device 100. The memory consumer may access memory 110 for reads and/or writes. In an example, memory manager 102 maintains a set of pages tables 108 for memory consumer 106 and a set of page tables 138 for memory consumer 136. Page tables are used to establish an association between the virtual address spaces of user processes and the physical memory of the system (RAM, page frames). Each stored entry of a page table is called a page table entry. Although two memory consumers are illustrated as running on computing device 100, it should be understood that one or more memory consumers may run on computing device 100 and each of these memory consumers may have their own set of pages tables.

A. Application as Memory Consumer

In some examples, one or more memory consumers is an application, and memory manager 102 is an operating system that serves as an intermediary layer between hardware 104 and the software (e.g., applications running on computing device 100). In an example, the operating system is a LINUX® operating system. Trademarks are the property of their respective owners. The operating system manages resources of computing device 100 when one or more applications are running on computing device 100. In an example, the operating system may share available resources (e.g., CPU time, disk space, and network connections) between various system processes while at the same time ensuring system integrity. The operating system may use a memory management technique called virtual memory, which maps virtual addresses used by an application into physical addresses in memory 110. In a virtual memory system, the addresses seen by user programs do not directly correspond to the physical addresses used by the hardware. CPU 112 may include a memory management unit (MMU) (not shown) that supports the use of virtual memory. With the MMU, memory addresses may go through a translation step from a virtual address to a physical address prior to each memory access. Memory 110 may include random access memory (RAM), and a MMU may divide the RAM into pages. A page is a contiguous section of memory of a set size that is handled by the MMU. In an example, each page is four kilobytes (KB).

In an example, each entry in a page table maps a location in an application's virtual memory space to a location in the physical memory space. In an example, address translation transforms addresses in the application's virtual address space to locations in physical memory (e.g., memory 110). The page table entry for a virtual page has permission bits that specify what a user space process can and cannot do with the particular page. The permission bits may specify whether a user space process may perform read, write, and/or execute (execution permission indicates that page binary data may be executed as machine code in the same way as programs are executed) operations on the page. In an example, CPU 112 may use set of page tables 108 to translate virtual memory addresses allocated to memory consumer 106 to physical memory addresses, and to ensure that an entity has permission to perform a particular action on a memory page.

B. Virtual Machine as Memory Consumer

In some examples, memory manager 102 is a hypervisor, and one or more memory consumers is a virtual machine. A virtual machine is a portion of software that, when executed on appropriate hardware, creates an environment allowing the virtualization of an actual physical computer system. Each virtual machine may function as a self-contained platform, running its own operating system and software applications (processes). A host machine (e.g., computer or server) is typically enabled to simultaneously run one or more virtual machines, where each virtual machine may be used by a local or remote client. The host machine allocates a certain amount of the host's resources to each of the virtual machines. For example, the hypervisor allocates guest memory to a guest running on a virtual machine. Each virtual machine may use the allocated resources to execute applications, including operating systems known as guests or guest operating systems. The hypervisor virtualizes the underlying hardware of the host machine or emulates hardware devices, making the use of the virtual machine transparent to the guest operating system or the remote client that uses the virtual machine. Typically, a hypervisor manages allocation and virtualization of computer resources and performs context switching, as may be necessary, to cycle between various virtual machines.

In a virtualization environment, the hypervisor and each guest running on a host machine has its own set of page tables. In this example, the hypervisor maintains a set of page tables 108 including one or more mappings from guest-physical memory addresses to host-physical memory addresses, which correspond to physical memory on a native platform. Host-physical memory is hardware memory (e.g., memory 110). Additionally, each guest may maintain its own set of guest page tables (not shown), which includes one or more mappings from guest-virtual memory addresses to guest-physical memory addresses, which are the guest's illusion of physical memory. This illusion is supported by the hypervisor, which maps the guest's guest-physical memory addresses to host-physical memory addresses. The translation from guest-physical memory addresses to host-physical memory address is a real-to-physical mapping that implements the virtualization of memory in a virtual machine system. The combined total size of the guest-physical memory space of all the guests running on the host machine may be bigger than the actual physical memory on the system.

Each entry in a guest page table maps a location in the guest's virtual memory space to a location in the guest's physical memory space. Address translation in the guest transforms addresses in its guest-virtual address space to locations in guest-physical memory using the set of guest page tables. To convert a guest-physical memory address to a host-physical memory address, the hypervisor maintains a real map table mapping guest-physical memory pages to host-physical memory pages, and in particular uses set of page tables 108 to translate guest-physical memory addresses to host-physical memory addresses.

Each entry in a page table of set of page tables 108 may include a mapping from a location in a virtual machine's virtual memory space to a location in the physical memory space. In an example, address translation transforms addresses in the virtual machine's virtual address space to locations in physical memory (e.g., memory 110). The page table entry for a virtual page has permission bits that specify what the running on the virtual machine can and cannot do with a particular page. The permission bits may specify whether the guest may perform read, write, and/or execute (execution permission indicates that page binary data may be executed as machine code in the same way as programs are executed) operations on the page. The hypervisor may use set of page tables 108 to translate virtual memory addresses to physical memory addresses and to ensure that an entity has permission to perform a particular action on a memory page.

III. Example Process Flow

Memory manager 102 includes a memory deduplication module 122 and a protection module 124. Memory deduplication module 122 may maintain one or more memory pages in memory 110 in a tree structure and detect when two or more memory pages in the tree are identical. Each of these identical memory pages may be referenced in a page table entry of the memory consumer that uses the respective memory page. For example, if memory consumer 106 stores data in memory page 140, memory consumer 106's set of page tables 108 may include a page table entry that stores a mapping to memory page 140. Similarly, if memory consumer 136 stores data in memory page 142, memory consumer 136's set of page tables 138 may include a page table entry that stores a mapping to memory page 142. If memory deduplication module 122 determines that memory pages 140 and 142 are identical memory pages, memory deduplication module 122 may deduplicate the identical memory pages by updating one of these mappings to reference as read-only (i.e., with write protection) one of these memory pages and free the other memory page. In response to detecting an attempted write to the remaining identical memory page, memory deduplication module 122 may create a copy of the memory page and update the mapping in the writing memory consumer's page table entry to reference the copy of the memory page rather than the initial identical memory page. Although memory deduplication has its advantages, it may also be desirable to protect particular memory pages from being deduplicated in order to reduce the leakage of information.

Figure 2:
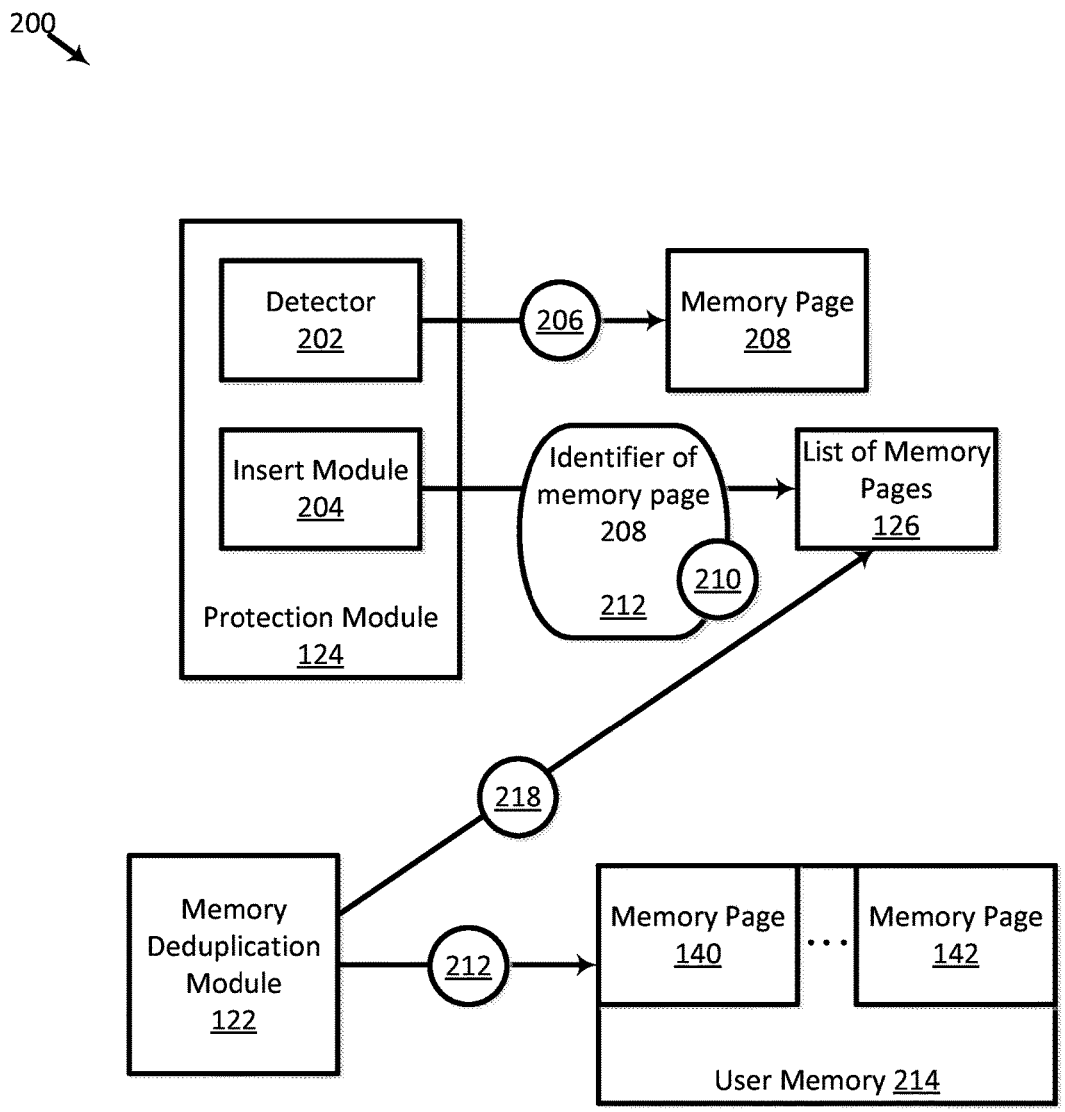
FIG. 2 illustrates a process flow for providing memory deduplication protection for one or more memory pages in accordance with one or more aspects of the present disclosure.

FIG. 2 illustrates a process flow 200 for providing memory deduplication protection for one or more memory pages in accordance with one or more aspects of the present disclosure. In the example illustrated in FIG. 2, protection module 124 includes a detector 202 and an insert module 204. At an action 206, detector 202 may detect that a memory page 140 stores data of a first type. Memory page 140 may be located in an address space allocated to memory consumer 106, and the address space may be a virtual address space. In some examples, data of the first type is security-sensitive data.

Detector 202 may determine that memory page 140 stores data of the first type using various techniques. In an example, detector 202 reads a file attribute corresponding to a memory page and the file attribute indicates whether the memory page stores security-sensitive data. In such an example, detector 202 may detect that the memory page stores data of the first type in response to determining that the file attribute indicates that the memory page stores security-sensitive data. In another example, memory consumer 106 sends a message to memory manager 102, where the message indicates that a memory page stores data of the first type. The message may also include a virtual memory address of the memory page. In such an example, memory manager 102 may include detector 202, which detects that the memory page stores data of the first type in response to the message from memory consumer 106. In some examples, the message may include a request to execute a system call at memory manager 102, where the system call indicates that a particular memory page stores data of the first type. In such an example, memory manager 102 may detect that the memory page stores data of the first type in response to receiving the request to execute the system call.

A file attribute may correspond to a memory page in a variety of ways. In an example, the file attribute can be set on the executable binary file of the application into who's memory the memory page is mapped. In another example, the file attribute can be set on a file that is mapped into application memory, where the memory page is part of the mapping.

In another example, detector 202 determines whether the memory consumer to which a memory page is allocated is marked as security-sensitive (e.g., by a file attribute). In such an example, in response to determining that the memory consumer to which the memory page is allocated is marked as security-sensitive, detector 202 may detect that the memory page stores data of the first type. In another example, detector 202 may read a flag corresponding to a memory page, where the flag indicates whether the memory page stores data of the first type. In such an example, in response to determining that the flag indicates that the memory page stores security-sensitive data, detector 202 may detect that the memory page stores data of the first type. There are merely examples, and other examples are within the scope of the present disclosure.

If detector 202 detects that a particular memory page stores data of the first type, detector 202 may provide this information to insert module 204. In some examples, protection module 124 may perform an action to indicate that a particular memory page stores data of the first type. In the example illustrated in FIG. 2, protection module 124 maintains list of memory pages 126 for which memory deduplication is avoided. At an action 210, insert module 204 may insert an identifier 212 into list of memory pages 126, where identifier 212 identifies memory page 140. The identifier of a memory page may be, for example, the virtual memory address of the memory page, a hash of the data stored in the memory page, or the data stored in the memory page. Actions 206 and 210 may be performed for each memory page that stores data of the first type.

At an action 212, memory deduplication module 122 scans a set of memory pages in user memory 214. User memory 214 may store a plurality of memory pages that correspond to physical memory addresses in memory 110. The scanned set of memory pages may include memory pages 140 and 142. Memory deduplication module 122 may determine whether memory page 140 and memory page 142 are identical memory pages. Memory pages are identical memory pages if they store the same content. If memory pages 140 and 142 are not identical memory pages, then memory deduplication module 122 does not deduplicate them. If memory pages 140 and 142 are identical memory pages, then memory deduplication module 122 may deduplicate them. It may be undesirable, however, to deduplicate a memory page if it stores security-sensitive data.

At an action 218, memory deduplication module 122 may check whether an identifier of memory page 140 (or an identifier of memory page 142) is included in list of memory pages 126. If an identifier of a memory page is included in list of memory pages 126, the memory page stores security-sensitive data and should not be deduplicated. In response to determining that the identifier of memory page 140 is not included in list of memory pages 126, memory deduplication module 122 may deduplicate the memory page. In such an example, memory consumer 106's set of page tables 108 may include a mapping that references memory page 140, and memory consumer 136's set of page tables 138 may include a mapping that references memory page 142. Memory deduplication module 122 may update the mapping in set of page tables 138 to reference memory page 140 rather than memory page 142, and free memory page 142 so that it may be used to store other data. Accordingly, both memory consumer 106's set of page tables 108 and memory consumer 136's set of page tables 138 may store a mapping that references memory page 140.

In contrast, in response to determining that the identifier of memory page 140 is included in list of memory pages 126, memory deduplication module 122 may determine that memory page 140 should not be deduplicated to provide memory deduplication protection for memory page 140. Accordingly, memory deduplication module 122 may "skip" memory page 140 and scan other memory pages to determine whether they should be deduplicated.

Figure 3:
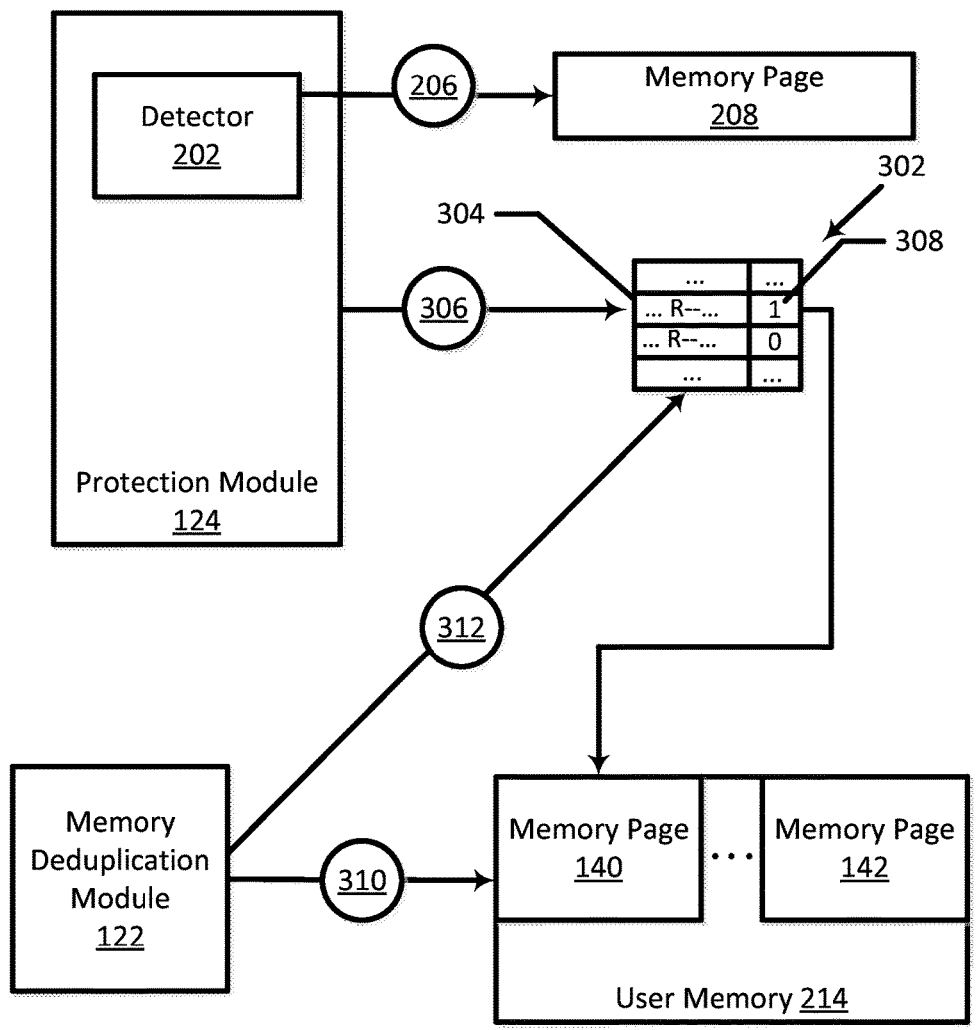
FIG. 3 illustrates a process flow for providing memory deduplication protection for one or more memory pages in accordance with one or more aspects of the present disclosure.

Although in FIG. 2, protection module 124 maintains list of memory pages 126 to keep track of memory pages that store data of the first type, this is not intended to be limiting and protection module 124 may use other techniques to keep track of memory pages that store data of the first type. FIG. 3 illustrates a process flow 300 for providing memory deduplication protection for one or more memory pages in accordance with one or more aspects of the present disclosure. In FIG. 3, at an action 206, detector 202 may detect that memory page 140 stores data of a first type. A page table 302 may be part of set of page tables 108, where one or more page table entries may include a mapping that references memory pages in memory consumer 106's address space and/or includes a deduplication protection indicator that indicates whether a memory page is in a protected mode. If a memory page is in the protected mode, the memory page should not be deduplicated. If a memory page is not in the protected mode, the memory page may be in the deduplication mode, which indicates that the memory page may be deduplicated. In the present disclosure, if the deduplication protection indicator associated with a memory page is in the protected mode, then the memory page may be referred to as being in the protected mode. Similarly, if the deduplication protection indicator associated with a memory page is in the deduplication mode, then the memory page may be referred to as being in the deduplication mode.

Page table 302 includes a page table entry 304 that stores a reference to memory page 140 and also stores a deduplication protection indicator 306 associated with memory page 140. At an action 306, protection module 124 sets a deduplication protection indicator 308 included in page table entry 304 to a protected mode that provides memory deduplication protection for memory page 140, which is associated with deduplication protection indicator 308. It should be understood that although deduplication protection indicator 308 is illustrated as being included in page table entry 304, deduplication protection indicator 308 may be included in another data structure such as one that is specifically meant to keep track of memory pages that store data of the first type. In FIG. 3, deduplication protection indicator 308 may be a protection bit, and protection module 124 may set the deduplication protection indicator to the protected mode by setting the protection bit to one. Likewise, protection module 124 may set deduplication protection indicator 308 to the deduplication mode by setting the protection bit to zero. In some examples, protection module 124 sets the deduplication protection indicator to the protection mode in response to detector 202's detection that the memory page associated with the deduplication protection indicator stores data of the first type.

It should be understood that protection module 124 may set deduplication protection indicator 308 to the protection mode by setting deduplication protection indicator 308 to a first value and may set deduplication protection indicator 308 to the deduplication mode by setting deduplication protection indicator 308 to a second value that is different from the first value. Additionally, the write permissions of memory page 140 are "R--," which indicates that memory page 140 is set to a read-only mode. Accordingly, a write to memory page 140 may result in a page fault that is handled by memory manager 102.

At an action 310, memory deduplication module 122 scans memory pages in user memory 214 and identifies scanned memory pages 140 and 142 as being identical memory pages. Memory deduplication module 122 may determine whether a deduplication protection indicator associated with one or more of the scanned memory pages is in the protected mode. At an action 312, memory deduplication module 122 may determine whether deduplication protection indicator 308 associated with memory page 140 indicates whether it is in the protected mode by reading deduplication protection indicator 308 in page table entry 304. In response to a determination that the scanned memory page is not in the protected mode (in which case the scanned memory page may be in the deduplication mode), memory deduplication module 122 determines that the scanned memory page may be deduplicated. In contrast, in response to a determination that the scanned memory page is in the protected mode, memory deduplication module 122 determines that the scanned memory page should not be deduplicated.

Protection module 124 may also perform an action that removes the memory deduplication protection for one or more memory pages. For example, if protection module 124 receives an indication that a memory page no longer stores data of the first type, protection module 124 may remove the memory deduplication protection for the memory page. Protection module 124 may receive the indication in a variety of ways. In an example, memory consumer 106 may send a message to memory manager 102 that memory page 140 no longer stores data of the first type. Memory manager 102 may receive this message to accordingly receive the indication that memory page 140 no longer stores data of the first type.

In some examples, if memory consumer 106 is an application and memory manager 102 is an operating system, the operating system may receive the indication that a memory page allocated to memory consumer 106 no longer stores data of the first type in response to the operating system detecting an exit of the application. In some examples, if memory consumer 106 is a virtual machine and memory manager 102 is a hypervisor, the hypervisor may receive the indication that a memory page allocated to the virtual machine no longer stores data of the first type in response to the hypervisor detecting a shutdown of the virtual machine. In such an example, the hypervisor protects memory pages from being deduplicated by paravirtualization.

Protection module 124 may remove the memory deduplication protection for the memory page by performing an action that "undoes" the action that protection module 124 performed to indicate that the particular memory page stores data of the first type. In an example, if insert module 204 inserts an identifier of a memory page into list of memory pages 126 to indicate that the memory page stores data of the first type, insert module 204 may remove the identifier from list of memory pages 126 to indicate that the memory page does not store data of the first type. In another example, if protection module 124 sets a flag to indicate that a memory page stores data of the first type, insert module 204 may clear the flag to indicate that the memory page does not store data of the first type. In another example, if protection module 124 sets a deduplication protection indicator to a first a value to indicate that an associated memory page stores data of the first type, insert module 204 may set the deduplication protection indicator to a second value different from the first value to indicate that the associated memory page does not store data of the first type. These are, of course, merely examples and are not intended to be limiting.

As discussed above and further emphasized here, FIGS. 1-3 are merely examples, which should not unduly limit the scope of the claims. For example, it should be understood that one or more modules (e.g., memory deduplication module 122 and protection module 124) in FIG. 1 may be combined with another module. In an example, memory deduplication module 122 and protection module 124 may be combined into one module. It should also be understood that one or more modules in FIG. 1 may be separated into more than one module. In an example, protection module 124 is split into a first protection module and a second protection module 124.

Additionally, in FIGS. 2 and 3, memory manager 102 is depicted as including detector 202. In the examples illustrated in FIGS. 2 and 3, memory manager 102 may be an operating system and memory consumer 106 may be an application. In other examples, detector 202 may be included in memory consumer 106.

Figure 4:
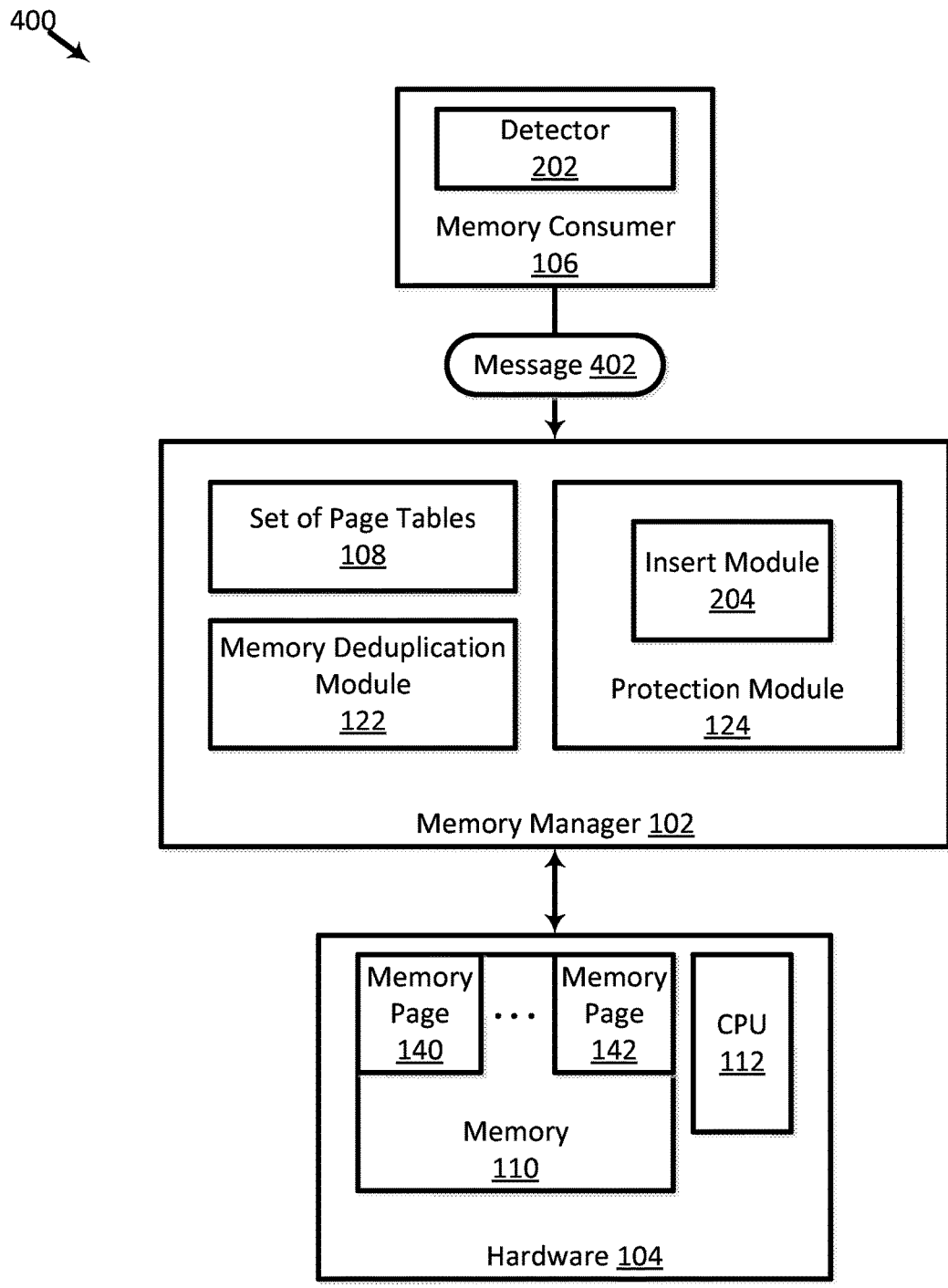
FIG. 4 depicts a computing device for providing memory deduplication protection for one or more memory pages in accordance with one or more aspects of the present disclosure.

FIG. 4 depicts a computing device 400 for providing memory deduplication protection for one or more memory pages in accordance with one or more aspects of the present disclosure. In FIG. 4, memory consumer 106 includes detector 202, and memory manager 102 includes protection module 124 and memory deduplication module 122. In such an example, memory consumer 106 may be a virtual machine and memory manager 102 may be a hypervisor that runs one or more virtual machines. In the example illustrated in FIG. 4, memory consumer 106, which includes detector 202, may detect that memory page 140 stores data of the first type.

In response to detecting that memory page 140 stores data of the first type, memory consumer 106 may send a message 402 indicating that memory page 140 stores data of the first type to memory manager 102. Memory manager 102 receives message 402 and performs an action to indicate that a particular memory page referenced in message 402 stores data of the first type. In an example, memory manager 102 maintains list of memory pages 126 for which memory deduplication is avoided and inserts an identifier of memory page 140 into list of memory pages 126. Message 402 may include the identifier of memory page 140. In another example, memory manager 102 sets deduplication protection indicator 308, which is associated with memory page 140, to the protected mode in response to receiving message 402. In such an example, setting deduplication protection indicator 308 to the protected mode indicates that memory page 140 stores data of the first type.

IV. Example Method

Figure 5:
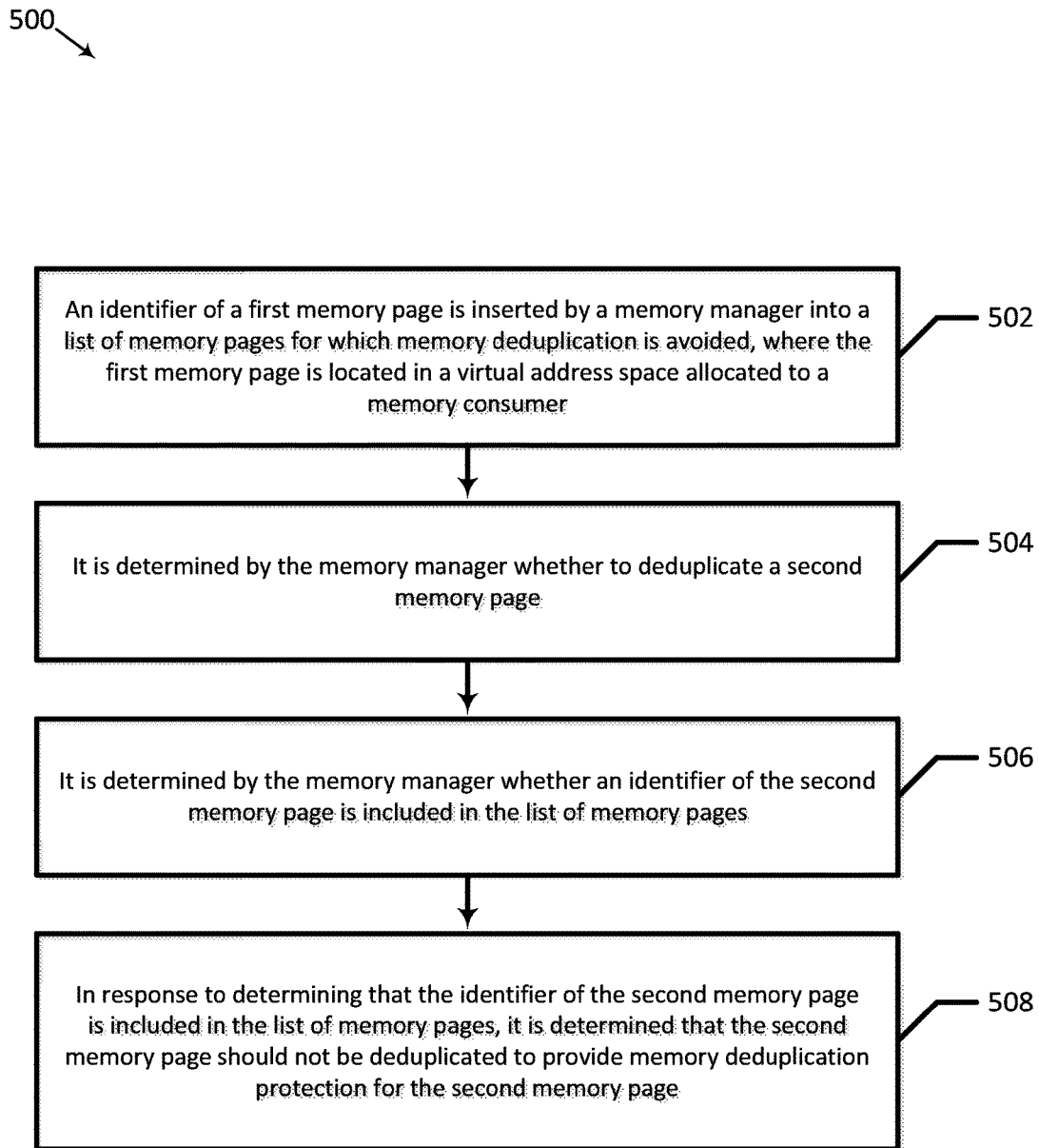
FIG. 5 is a simplified flowchart illustrating a method of providing memory deduplication protection for one or more memory pages in accordance with one or more aspects of the present disclosure.

FIG. 5 is a simplified flowchart illustrating a method 500 of providing memory deduplication protection for one or more memory pages in accordance with one or more aspects of the present disclosure. Method 500 is not meant to be limiting and may be used in other applications.

Method 500 includes blocks 502, 504, 506, and 508. In a block 502, an identifier of a first memory page is inserted by a memory manager into a list of memory pages for which memory deduplication is avoided, where the first memory page is located in a virtual address space allocated to a memory consumer. In an example, memory manager 102 inserts an identifier of memory page 140 into list of memory pages 126 for which memory deduplication is avoided, where memory page 140 is located in a virtual address space allocated to memory consumer 106. In such an example, the identifier of memory page 140 may be a virtual memory address of the memory page or a hash of the memory page. In a block 504, it is determined by the memory manager whether to deduplicate a second memory page. In a block 506, it is determined by the memory manager whether an identifier of the second memory page is included in the list of memory pages. In a block 508, in response to determining that the identifier of the second memory page is included in the list of memory pages, it is determined that the second memory page should not be deduplicated to provide memory deduplication protection for the second memory page.

In an example, the second memory page is memory page 140, and memory manager 102 determines whether to deduplicate this memory page. In such an example, memory manager 102 determines whether an identifier of memory page 140 is included in list of memory pages 126. In response to determining that the identifier of memory page 140 is included in list of memory pages 126, memory manager 102 determines that the memory page should not be deduplicated to provide memory deduplication protection for memory page 140. Accordingly, memory manager 102 skips memory page 140 and goes on to determine whether to deduplicate other memory pages. In another example, the second memory page is memory page 142, and memory manager 102 determines whether to deduplicate this memory page. In such an example, memory manager 102 determines whether an identifier of memory page 142 is included in list of memory pages 126. In response to determining that the identifier of memory page 142 is included in list of memory pages 126, memory manager 102 determines that the memory page should not be deduplicated to provide memory deduplication protection for memory page 142. Accordingly, memory manager 102 skips memory page 142 and goes on to determine whether to deduplicate other memory pages.

In some embodiments, one or more actions illustrated in blocks 502, 504, 506, and 508 may be performed for any number of memory pages corresponding to a memory consumer's address space. It is also understood that additional processes may be performed before, during, or after blocks 502, 504, 506, and 508 discussed above. It is also understood that one or more of the blocks of method 500 described herein may be omitted, combined, or performed in a different sequence as desired.

V. Example Computing System

Figure 6:
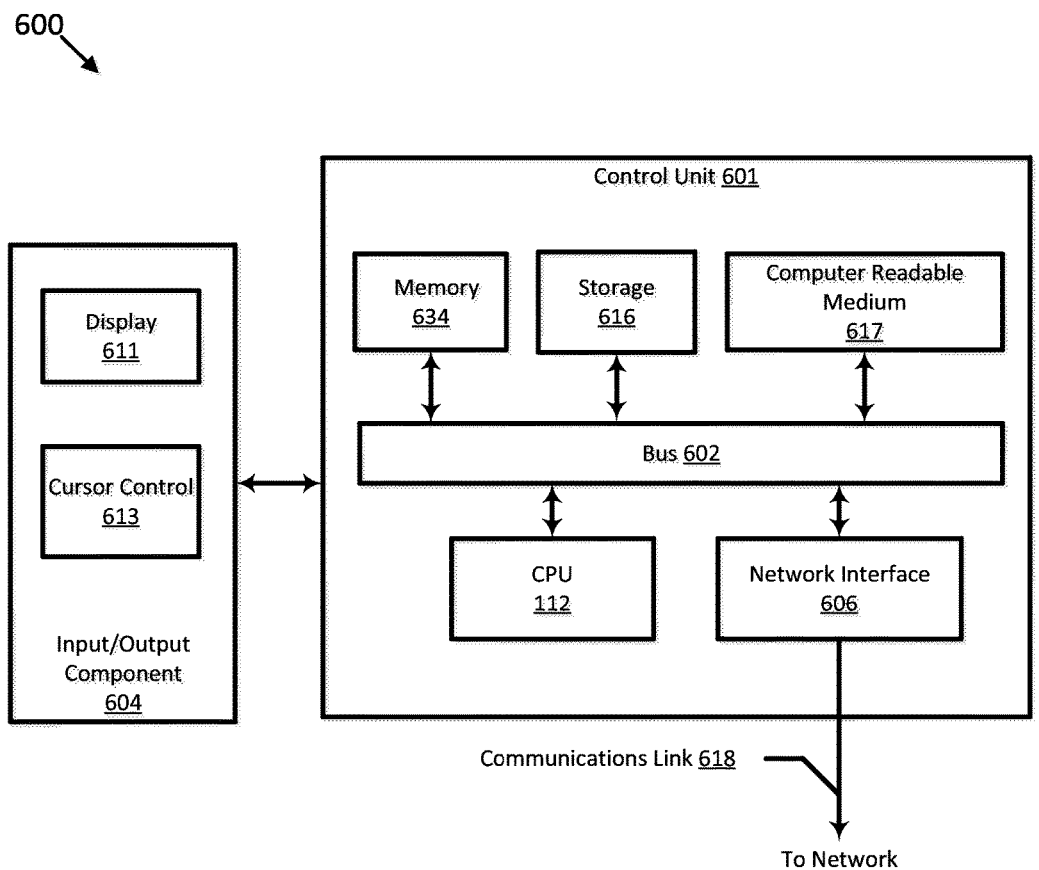
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, computer system 600 corresponds to computing device 100, which may include a client or a server computing device. The client or server computing device may include a plurality of CPUs. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a CPU or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. In an example, a user may interact with computer system 600 using I/O component 604 and cause memory consumer 106 to launch. For example, memory consumer 106 may be an application such as a web browser. In another example, a user may interact with a host computing system using I/O component 604 and cause memory consumer 106 to launch. In this example, the hypervisor may provide for deduplication and share identical memory pages among the different processes and/or virtualized guests. I/O component 604 may also include an output component such as a display 611, and an input control such as a cursor control 613 (such as a keyboard, keypad, mouse, etc.).

A transceiver or network interface 606 transmits and receives signals between computer system 600 and other devices via a communications link 618 to a network. In an embodiment, the transmission is wireless, although other transmission mediums and methods may also be suitable. CPU 112, which may be a micro-controller, digital signal processor (DSP), or other processing component, processes these various signals, such as for display on computer system 600 or transmission to other devices via communications link 618. CPU 112 may also control transmission of information, such as cookies or IP addresses, to other devices.

Components of computer system 600 also include a system memory component 634 (e.g., RAM), a static storage component 616 (e.g., ROM), and/or a disk drive 617. System memory component 634 may include memory 110 and user memory 214. Computer system 600 performs specific operations by CPU 112 and other components by executing one or more sequences of instructions contained in system memory component 634. Logic may be encoded in a computer readable medium, which may refer to any medium that participates in providing instructions to CPU 112 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 500) to practice the present disclosure may be performed by computer system 600. In various other embodiments of the present disclosure, a plurality of computer systems 600 coupled by communication links 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of providing memory deduplication protection for one or more memory pages, comprising:
scanning a plurality of memory pages residing in user memory; and
for each scanned memory page of the plurality of memory pages:
determining that the scanned memory page is a duplicate of a second memory page; and
in response to the determination that the scanned memory page is a duplicate of the second memory page:
determining that the scanned memory page and the second memory page stores security-sensitive data by:

reading, by a memory manager, a file attribute indicating that the scanned memory page stores security-sensitive data;

in response to the determination that the scanned memory page stores security-sensitive data, inserting, by the memory manager, an identifier of the scanned memory page into a list of memory pages for which memory deduplication is avoided, wherein the scanned memory page is located in a virtual address space allocated to a memory consumer;

in response to the determination that the second memory page stores security-sensitive data, inserting, by the memory manager, an identifier of the second memory page into the list of memory pages;

in response to a determination that the identifier of the scanned memory page is included in the list of memory pages, preventing deduplication of the scanned memory page; and in response to a determination that the identifier of the second memory page is included in the list of memory pages, preventing deduplication of the second memory page.

2. The method of claim 1, wherein the memory manager is an operating system executing in a machine, and the memory consumer is an application running in the machine.

3. The method of claim 2, further comprising:
receiving, by the operating system, a request from the application to execute a system call indicating that the scanned memory page stores security-sensitive data, wherein the request includes a virtual memory address of the scanned memory page, and the identifier of the scanned memory page is the virtual memory address of the scanned memory page.

4. The method of claim 1, wherein the memory manager is a hypervisor that runs a virtual machine and allocates guest memory to a guest running on the virtual machine, and wherein the memory consumer is the virtual machine.

5. The method of claim 4, further comprising:
receiving, by the hypervisor from the virtual machine, a message that the scanned memory page stores security-sensitive data; and
in response to receiving the message, determining, by the hypervisor, that the scanned memory page stores security-sensitive data.

6. The method of claim 1, wherein inserting the identifier of the scanned memory page into the list of memory pages includes setting a memory page flag in the memory consumer's page table to provide deduplication protection for the first memory page.

7. A system for providing memory deduplication protection for one or more memory pages, comprising:
a memory that stores a plurality of memory pages;
a memory deduplication module that determines whether a first memory page of the plurality of memory pages is a duplicate of a second memory page;
a detector that in response to a determination that the first memory page is a duplicate of the second memory page, determines whether each of the first and second memory pages stores security-sensitive data, reads a file attribute indicating whether the first memory page stores security-sensitive data, and determines that the first memory page stores security-sensitive data if the file attribute indicates that the first memory page stores security-sensitive data; and
a protection module that in response to a determination that the first memory page stores security-sensitive data, inserts an identifier of the first memory page into a list of memory pages for which memory deduplication is avoided, wherein in response to a determination that the second memory page stores security-sensitive data, the protection module inserts an identifier of the second memory page into the list of memory pages, and wherein the first memory page is located in a virtual address space allocated to a memory consumer,
wherein in response to a determination that the identifier of the first memory page is included in the list of memory pages, the memory deduplication module prevents deduplication of the first memory page, wherein in response to a determination that the identifier of the second memory page is included in the list of memory pages, the memory deduplication module prevents deduplication of the second memory page, and wherein in response to a determination that identifiers of the first and second memory pages are not included in the list of memory pages, the memory deduplication module deduplicates the second memory page.

8. The system of claim 7, wherein the detector determines that the first memory page stores security-sensitive data.

9. The system of claim 8, further comprising:
a memory manager that includes the detector, protection module, and memory deduplication module, wherein the memory manager is an operating system.

10. The system of claim 8, further comprising:
a memory manager that includes the protection module and memory deduplication module, wherein the memory manager is a hypervisor that runs a virtual machine and allocates guest memory to a guest running on the virtual machine.

11. The system of claim 10, wherein the memory consumer includes the detector, and wherein the memory consumer sends a message indicating that the first memory page stores security-sensitive data to the memory manager.

12. The system of claim 11, wherein the memory manager receives the message and in response to the message, the detector determines that the first memory page stores security-sensitive data.

13. A non-transitory machine-readable medium comprising a plurality of machine-readable instructions that when executed by one or more processors is adapted to cause the one or more processors to perform a method comprising:
scanning a plurality of memory pages residing in user memory; and
for each scanned memory page of the plurality of memory pages:
determining whether the scanned memory page is a duplicate of a second memory page; and
in response to a determination that the scanned memory page is a duplicate of the second memory page:
determining whether each of the scanned memory page and the second memory page stores security-sensitive data;
reading, by a memory manager, a file attribute indicating whether the scanned memory page stores security-sensitive data;
determining that the scanned memory page stores security-sensitive data if the file attribute indicates that the scanned memory page stores security-sensitive data;
in response to a determination that the scanned memory page stores security-sensitive data, inserting, by the memory manager, an identifier of the scanned memory page into a list of memory pages for which memory deduplication is avoided, wherein the scanned memory page is located in a virtual address space allocated to a memory consumer;

in response to a determination that the second memory page stores security-sensitive data, inserting, by the memory manager, an identifier of the second memory page into the list of memory pages;

in response to a determination that the identifier of the scanned memory page is included in the list of memory pages, preventing deduplication of the scanned memory page;

in response to a determination that the identifier of the second memory page is included in the list of memory pages, preventing deduplication of the second memory page; and in response to a determination that the identifiers of the scanned and second memory pages are not included in the list of memory pages, deduplicating the second memory page.

14. The method of claim 1, wherein the identifier of the scanned memory page is a hash of the security-sensitive data stored at the scanned memory page.

15. The method of claim 1, further comprising:
determining that the scanned memory page stores security-sensitive data.

16. The method of claim 15, further comprising:
receiving, by the memory manager, an indication that the scanned memory page no longer stores security-sensitive data; and in response to the indication, removing the identifier of the scanned memory page from the list of memory pages.

17. The method of claim 16, further comprising:
after removing the identifier of the scanned memory page from the list of memory pages, determining that the scanned memory page is a duplicate of a third memory page;

determining whether an identifier of the third memory page is included in the list of memory pages; and in response to a determination that the identifiers of the scanned and third memory pages are not included in the list of memory pages, deduplicating the scanned memory page.

18. The method of claim 16, further comprising:
after removing the identifier of the scanned memory page from the list of memory pages, receiving, by the memory manager, a second indication that the scanned memory page stores security-sensitive data; and in response to the second indication, inserting the identifier of the scanned memory page into the list of memory pages.

19. The system of claim 8, wherein the protection module receives an indication that the first memory page no longer stores security-sensitive data, wherein in response to the indication, the protection module removes the identifier of the first memory page from the list of memory pages, wherein after the identifier is removed from the list of memory pages, the protection module receives a second indication that the scanned memory pages stores security-sensitive data, and wherein in response the second indication, the protection module inserts the identifier of the first memory page into the list of memory pages.

* * * * *